United States Patent [19]
Nye

[11] 3,754,148
[45] Aug. 21, 1973

[54] SECURITY SYSTEM FOR PREVENTING UNAUTHORIZED USE OF ELECTRIC CIRCUITS

[75] Inventor: Glenn R. Nye, Denver, Colo.

[73] Assignee: Space Electronics, Inc., Englewood, Colo.

[22] Filed: July 24, 1972

[21] Appl. No.: 274,227

[52] U.S. Cl. ............... 307/10 AT, 340/63, 317/134
[51] Int. Cl. .............................................. H02g 3/00
[58] Field of Search ................ 307/10 AT; 180/114; 317/134; 70/277, 278; 340/63

[56] References Cited
UNITED STATES PATENTS
3,691,396  9/1972  Hinrichs .............................. 317/134

Primary Examiner—Herman J. Hohauser
Attorney—Wm. Griffith Edwards

[57] ABSTRACT

A coded security system for an electric circuit includes a bank of touch type switches and requires selection of a plurality of the switches in predetermined order to render the circuit effective together with an arrangement for bypassing the security system during servicing or adjustment or other authorized use of the circuits. The bypassing arrangement is coded to require the simultaneous operation of a plurality of the touch switches after the first coded switches have been actuated to render the circuit effective. The circuitry for the system is enclosed in an armored and locked box to prevent tampering or unauthorized alteration of the codes. The system is described as applied to an automobile ignition circuit to prevent unauthorized use of the automobile.

12 Claims, 6 Drawing Figures

Patented Aug. 21, 1973 3,754,148

Patented Aug. 21, 1973
3,754,148
3 Sheets-Sheet 2
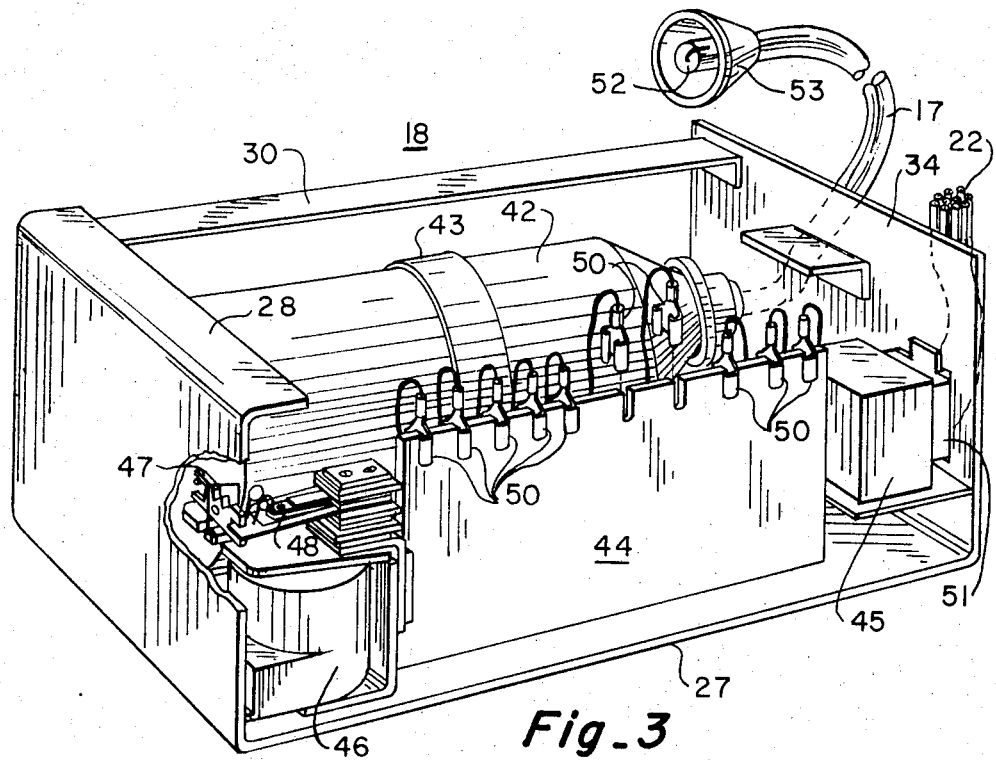
Fig_3
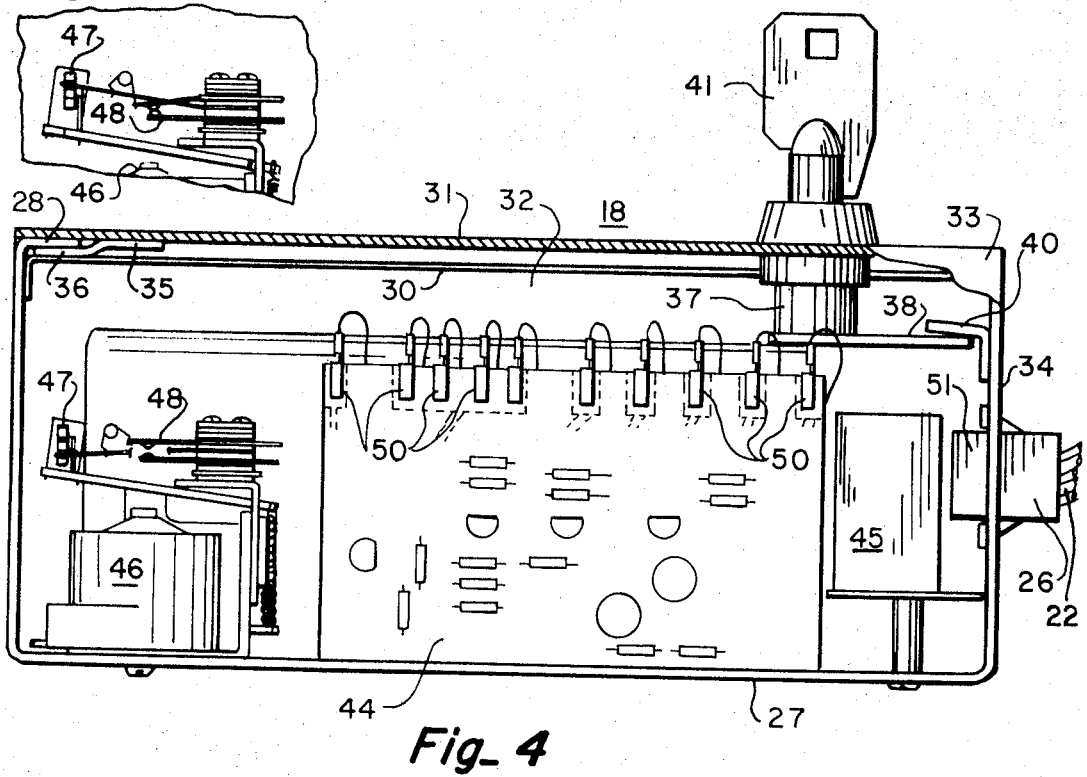
Fig_4
Fig_5

Patented Aug. 21, 1973

SECURITY SYSTEM FOR PREVENTING UNAUTHORIZED USE OF ELECTRIC CIRCUITS

This invention relates to security systems for preventing unauthorized use of electric circuits such as automobile ignition circuits and, particularly, to an improved coded system for selectively controlling the effectiveness of the secured circuit.

Various security control systems have been provided heretofore for preventing the unauthorized use of the locks on building doors and electric control circuits such as the electric ignition circuits of automobiles. These prior systems include those employing coded actuating switches for preparing electric circuits for utilization upon introduction of a predetermined code. Some of the systems available heretofore appear to have been effective for various uses; however, they have not been fully effective for all applications. Accordingly, it is an object of the present invention to provide an improved code controlled system for preventing unauthorized use of an electric circuit.

It is another object of this invention to provide an improved code controlled system for preventing the unauthorized use of an automobile ignition system.

It is a further object of this invention to provide a code controlled system for preventing unauthorized use of an electric circuit including an improved arrangement for rendering the coded system ineffective, thereby permitting authorized use of the electric circuit for servicing or repair.

Briefly, in carrying out the objects of this invention in one embodiment thereof, an automobile ignition circuit is provided with a code selector controlled system including a plurality of electric switches of the touch button type mounted where it is accessible to the driver when at the wheel. The ignition coil and a semiconductor coded circuit together with control relays are mounted in a locked armored box under the hood of the car. A plurality of switches, say three, are selected for operation in a predetermined order constituting the enabling code; the actuation of these switches in any other order or the actuation of any of the switches not selected for the code immediately resets the circuit. Quick detachable connectors in the box are provided for changing the code. Simultaneous actuation of a plurality, say two, of the switches after the selection of the required code is effective to bypass the code actuated relay and permit use of the ignition system without the need of knowing and using the code. Thus, the automobile may be left for servicing without requiring that the service personnel know the code. The coded system may also be bypassed by unlocking and opening the box to actuate manually a bypassing switch to connect the ignition circuit in its normal manner for energization by operation of the ignition key.

The features of novelty which characterize this invention are pointed out with particularity in the claims annexed to and forming a part of this specification. The invention itself, however, both as to its organization and its manner of operation, together with further objects and advantages thereof, may best be understood from the following description taken in connection with the accompanying drawings in which:

FIG. 3 is an isometric view showing the interior of the control box, the cover having been removed;

FIG. 4 is a side elevation view partly broken away and partly in section of the box with the cover in place;

FIG. 5 is a view of a relay switch shown in FIG. 4 when in its actuated position.

Figure 1:
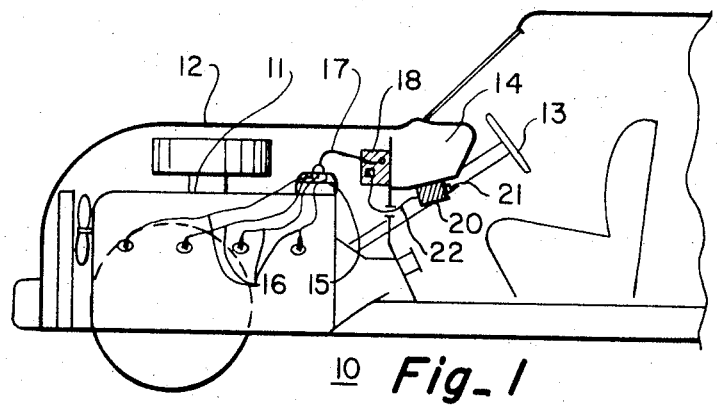
FIG. 1 is a diagrammatic side elevation view of an automobile indicating the locations of the components of the system of the present invention.

Referring now to the drawings, FIG. 1 illustrates the forward portion of an automobile 10 broken away to show the engine indicated at 11 and the hood 12 and the steering wheel 13 and the dashboard 14 within the car body. A distributor indicated at 15 is provided in the usual manner to supply electric impulses in predetermined order to the spark plugs of the engine 11 through distributor leads 16. The distributor receives high voltage impulses through a lead 17 connected to an ignition coil arranged within a steel casing 18.

The casing 18 if of heavy gauge steel plate and contains semiconductor circuitry for effecting the functions of the present invention and also contains the ignition coil. The casing or box 18 is provided with a lock requiring a key to actuate it. The control for the circuits within the box 18 is effected by a multiplicity of switches on a switch box or console 20 arranged on the under side of the dashboard 14 where the switches, the end one of which is indicated at 21, are readily accessible to the driver. The switch connections pass through a cable 22 to the box 18.

When the car is to be started, the driver turns the ignition key to the "on" position in the usual way and then presses a selected number of the buttons of the unit 20 in a predetermined order whereupon a light signal appears indicating that the circuit is ready for starting, whereupon the driver turns his key to the starting position in the usual manner and starts the engine.

Figure 2:
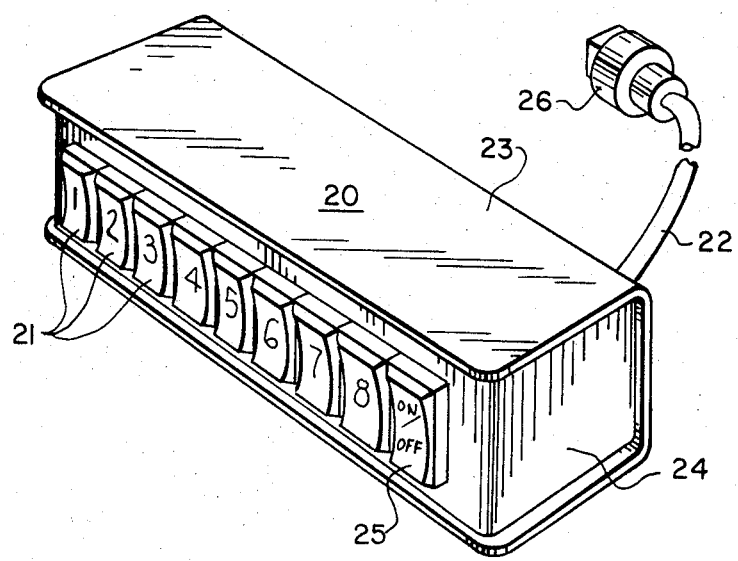
FIG. 2 is an isometric view of the code selector board for the system.
Figure 6:
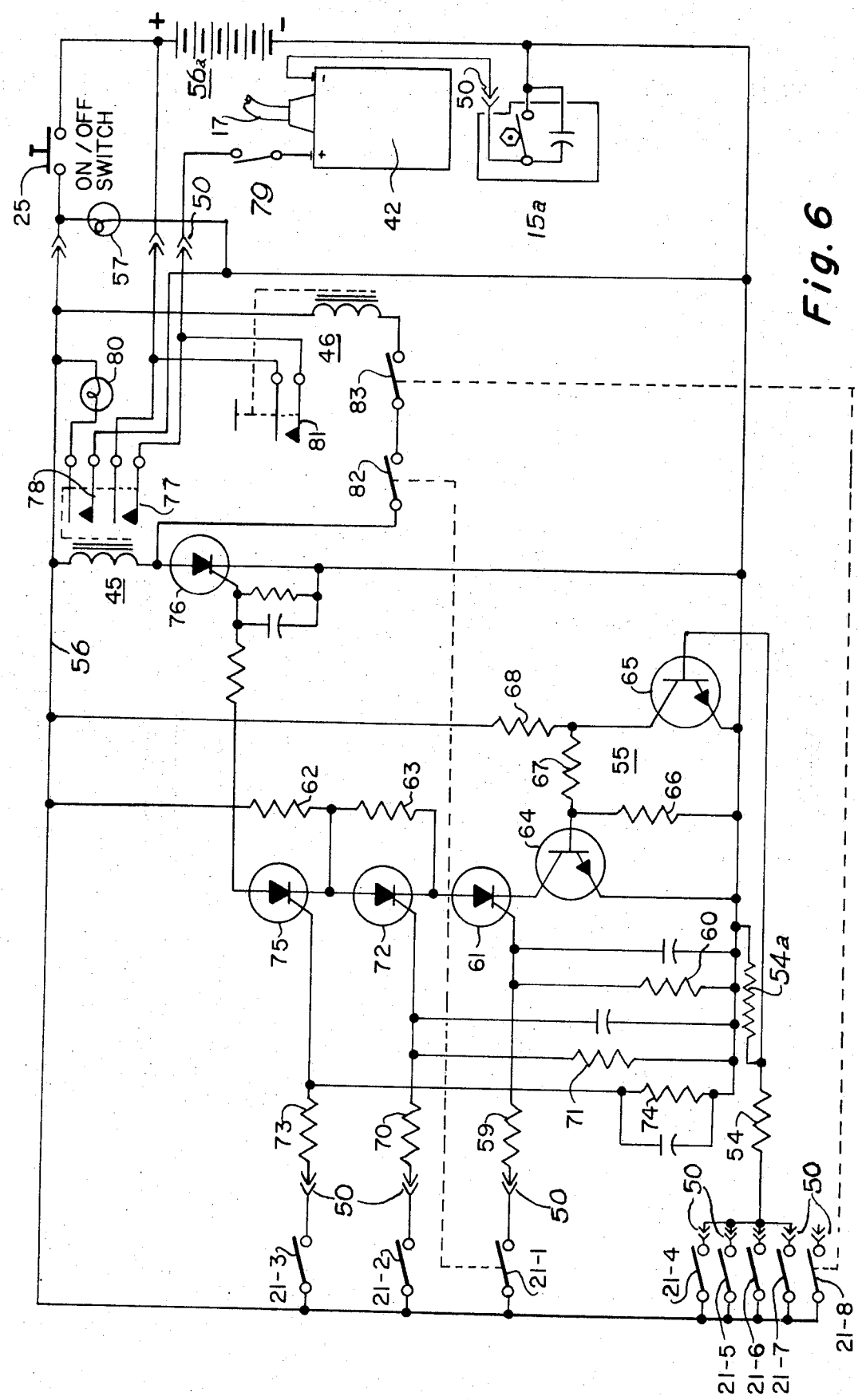
FIG. 6 is a circuit diagram of the system of the invention.

The outside appearance of the switch console unit 20 is indicated in FIG. 2. This unit includes an outer rectangular channel shaped member comprising the top, bottom and back walls of the unit and a second channel shaped member 24 forming the front and end walls. Eight switches 21 are provided which protrude from the front wall and a ninth switch button 25 is provided which is marked ON-OFF and which is pressed before inserting the code by pressing the required ones of the selector buttons 21. A light behind the button 25 indicates that the system is energized when the correct combination has been selected. When the ON-OFF button 25 is pressed, it closes a switch which energizes a light or lights behind the buttons for the digits 1 through 8 and thereby indicates that the system is in readiness for code insertion. The switch 25 is of the alternate operating type and on first being pressed closes a switch to the lights for the digital buttons as well as connecting the 12-volt positive terminal of the battery to the common side of all of the digital switches 21 which are designated 21-1 through 21-8. A green light preferably is provided behind the button 25 and is energized when the correct code has been selected. A plug or fitting 26 at the end of the lead 22 is provided for connection with the circuits within the box 18.

The box 18, as illustrated in FIGS. 3 and 4, comprises a heavy steel bottom and end member 27, the near end having a flange 28 turned parallel to the bottom, and a brace 30 connecting the two ends. The top and sides are formed by the one piece of sheet steel indicated at 31 in FIG. 4, longitudal sides indicated at 32 and 33 being formed of bent portions of the top wall and fitting against the outer edges of the end walls of the base member 27 as well as resting on the sides 28 and top wall of the far end which is indicated at 34. The top wall is provided with a strip 35 welded to the underside thereof adjacent the flange 28 and having an offset portion 36 for engaging the underside of the flange 28 by sliding the top longitudinally to the left so that the flange is engaged between the top wall and the offset 36. In order to secure the top wall member to the lower member 27, a lock 37 is provided which has a latched member 38 arranged to be turned under and to engage an angle piece 40 securely welded to the inside of the front wall 34. When the lock is in this position, it prevents ready removal of the top wall and minimizes the likelihood of tampering. The lock 37 is actuated by a removable key 41. The ignition coil is mounted within the box 18 as indicated at 42 and is secured in place by a detachable strap 43. In a space adjacent the coil there are mounted the printed circuit board of the system indicated at 44, together with a code actuated relay 45 and a latching relay 46. The latching relay 46 is actuated when it is desired to provide a bypass so that the ignition system may be used by a person not having a knowledge of the code. The relay 46 is provided with a rocker member 47 which is moved to one position for closing the contacts of a switch 48 and to the other position for holding the contacts open. This relay is actuated alternately; thus, on first energization it closes the switch and upon a second energization will open it. In addition, the rocker member 47 may be actuated manually to place the switch in its closed position to allow use of the ignition system should the code circuitry be disabled.

The printed circuit board 45 is provided with a plurality of detachable clips or slides 50, two of which are shown in positions above the board to indicate their manner of attachment. These clips contact conductors on the printed circuit and make it possible to interchange the connections of the circuit easily and to select the code digits and the order in which they must be energized to prepare the ignition circuit for use.

The switch 48 of the relay 46 as illustrated in FIGS. 3 and 4 is in its open position and FIG. 5 illustrates the relay with the switch in its closed position.

A cable 22 is connected to the box 18 by fitting a plug 26 in a plug receptacle 51 which is accessible through the far end of the casing portion 27 as viewed in FIGS. 3 and 4.

The high voltage output lead 17 from the ignition coil 42 to the distributor 15 also passes through the far end of the base member 27, as indicated in FIG. 3, and carries a fitting 52 for engagement with the distributor input and an insulated cover 53.

The operation of the security system will be more apparent from consideration of the circuit diagram, FIG. 5. In this system as illustrated, the switches 21 designated as 21-1, 21-2 and 21-3 have been selected for the code and are operated in that sequence. The four switches 21-4 through 21-7 are all arranged to actuate a reset circuit designated generally as 55 and to which they are connected through a voltage divider comprising resistances 54 and 54a. A remaining switch 21-8 is employed for the by-passing control.

When it is desired to start the vehicle, the ON-OFF button 25 is pressed to connect a line 56 to the positive terminal of the vehicle battery indicated at 56a. The closing of this circuit energizes a lamp or lamps indicated at 57 and provided as indicating lights for the switches 21-1 through 21-8. The illumination of these switches indicates to the driver or operator that the security system is in condition for code selection or input. The operator then presses the switches 21-1, 21-2 and 21-3 separately and in that order. When the switch 21-1 is operated, positive voltage is applied to a divider network comprising resistances 59 and 60 and triggers or turns on a triggerable switch illustrated as a silicon controlled rectifier (SCR) 61 which provides a current path through resistances 62 and 63 and reset circuit 55. The reset circuit is a Schmitt trigger including transistors 64 and 65 and a voltage divider circuit including resistors 66, 67 and 68. The resistor 66 is connected between the ground or common line and the base of the transistor 64, resistor 67 between the base of the transistor 64 and the collector of the transistor 65 and the resistor 68 between the collector of the transistor 65 and the positive side of the line. When the switch 21-2 is actuated, positive voltage is applied to a voltage divider network comprising resistances 70 and 71 causing a silicon controlled rectifier 72 to conduct so that current flows through the resistor 62 and the two SCR's 61 and 72 and through the reset circuit 55. When the switch 21-3 is operated, the positive voltage is applied to a network including a resistance 73 and a resistance 74 and their common terminals are connected to the control or trigger of a silicon controlled rectifier 75 causing this SCR to become conducting and to turn on a silicon controlled rectifier 76 which energizes the coil of relay 45 and closes its two switches 77 and 78. Closing switch 77 connects the ignition coil in the circuit of the ignition switch, indicated at 79, and thus to the positive side of the battery, the other side of the coil being connected to ground through the cam operated switch of the distributor, indicated at 15a. The upper switch 78 on closing energizes a lamp 80 which is located behind the ON-OFF push button on the console or dashboard panel and indicates that the correct code has been entered and that the ignition circuit may be energized and the car started. The lamp 80 and the color of the translucent button preferably produce a green light and the lamps behind the other push buttons white lights, the green light apprising the operator that the system is in condition for use. If at any time before the correct push buttons are pressed in the required order, a button is pressed out of order or one of the buttons 21-4 through 21-7 is pressed, the Schmitt trigger 55 will be reset and all the SCR's will be turned off. After the vehicle has been parked the system may be turned off again by pressing the ON-OFF button, thereby disconnecting the positive supply terminal from the switch circuit.

In the event it is desired to leave the car with the security system in condition so that a serviceman may operate the engine this may be accomplished by closing the relay 46 to close its switch, indicated at 81, thereby bypassing the switch 77 and leaving the ignition coil in the ignition circuit regardless of the condition of the switch 77. This is accomplished because the relay 46 is a latching relay which closes on one operation, opens on the next and so on. Energization of the relay 46 is effected by closing simultaneously the switches 21-1 and 21-8. Both of these switches are double bladed switches, the second blades being indicated at 82 and 83 and being connected in series in the circuit of the relay 46. This simultaneous closing of the switches 82 and 83 when the relay 45 is energized connects the coil of the relay 46 in parallel with the relay 45 and actuates relay 46, the relay remaining closed until its winding is again energized.

When it is desired to return the system to the control of the coded security circuit, the required code is again entered on the switches 21-1, 21-2 and 21-3 and both the switches 82 and 83 closed momentarily to again energize the winding of the relay 46 and return the relay to its open position. Thereafter, the system is under control of the coded circuit until the bypass is again actuated. As has been noted heretofore, the switch of the latching relay 46 may be actuated manually from within the box 18 by tipping the actuating member or rocker bar 47. This is primarily an emergency arrangement which may be utilized when the code responsive circuit is disabled.

Certain of the detachable clips 50 have been indicated on the circuit diagram by a double arrowhead symbol; it will be understood that all connections to the touch switches 21-1 to 21-8 are detachable and the leads sufficiently long for purposes of code selection, and that other leads to the printed circuit board 44, including the positive voltage and ground leads, are similarly detachable.

The security system of this invention thus provides an arrangement whereby a first code is available for normal operation of the system and a second code utilizing selected ones of the push buttons is available for locking the system out for use of the ignition circuit, for example, when an automobile is being serviced and the serviceman does not know the combination or code.

While a specific embodiment of the invention has been illustrated, other arrangements and modifications will occur to those skilled in the art. Therefore, it is not intended that the claims be limited to the specific details illustrated and described and it is intended that the claims cover all modifications within the spirit and scope of the invention.

I claim:

1. A security system for preventing unauthorized use of an electric circuit comprising:

a first relay including normally open contacts effective on closing for connecting the electric circuit to a direct current voltage source, coded circuit means for energizing the winding of said first relay to close said contacts, said coded circuit means including a set of touch type switches and a predetermined plurality of said switches less than the total member and triggerable switching devices connected to respective ones of said predetermined plurality of switches and effective upon actuation of said devices in a predetermined sequence for energizing the windings of said first relay, a second relay having normally open contacts connected in parallel with said contacts of said first relay and effective on closing for connecting the electric circuit to the direct current source regardless of the condition of said first relay, said second relay being of the latching type whereby it maintains its contacts closed after its winding is de-enerigzed, means actuated by the simultaneous actuation of a selected plurality of said touch type switches for energizing said second relay, and means for preventing energization of said second relay when said first relay is de-energized.

2. A security system for preventing unauthorized use of an electric circuit as set forth in claim 1 including means dependent upon actuation of said predetermined plurality of switches in other than said predetermined sequence for resetting said triggerable devices.

3. A security system for preventing unauthorized use of an electric circuit as set forth in claim 2 including means dependent upon actuation of any of a plurality of said set of switches other than said predetermined plurality of switches for resetting said triggerable devices.

4. A security system for preventing unauthorized use of an electric circuit as set forth in claim 1 including an armored box having an access cover and a lock for preventing unauthorized access thereto, said triggerable devices and said relays being mounted within said box, and said electric circuit including a utilization component mounted withn said box.

5. A security system as set forth in claim 4 including readily detachable connectors arranged within said box for connecting said touch type switches to said triggerable devices and to said resetting means whereby said switches may be selectively interchanged for effecting a change in the coding of said system.

6. A security system as set forth in claim 1 wherein each of said selected plurality of switches includes a respective normally open pair of contacts and said pairs are connected in series with one another and in parallel with the contacts of said first relay.

7. A security system as set forth in claim 1 wherein at least one of said selected plurality of said touch type switches is a second switch connected to be actuated simultaneously with one of said predetermined plurality of swithces.

8. A security system as set forth in claim 1 wherein said electric circuit is the starting system of an automotive vehicle.

9. A security system as set forth in claim 4 wherein said electric circuit is the starting system of an automotive vehicle, and said component is the ignition coil of said starting system.

10. A security system as set forth in claim 5 wherein said electric circuit is the starting system of an automotive vehicle, and the ignition coil of said starting system is mounted within said box.

11. A security system as set forth in claim 6 wherein said electric circuit is the starting system of an automotive vehicle and the ignition coil of said starting system is mounted within said box.

12. A security system as set forth in claim 5 including manually actuatable means within said box for connecting said circuit to the direct current source.

* * * * *